United States Patent [19]

Suzuki et al.

[11] Patent Number: 5,095,353
[45] Date of Patent: Mar. 10, 1992

[54] SIGNAL WAVEFORM DISPLAY DEVICE

[75] Inventors: Motoyuki Suzuki, Osaka; Shigemitsu Yamade, Ootsu, both of Japan

[73] Assignee: Matsushita Electric Industrial Co., Ltd., Japan

[21] Appl. No.: 727,195

[22] Filed: Jul. 9, 1991

Related U.S. Application Data

[62] Division of Ser. No. 570,250, Aug. 20, 1990.

[30] Foreign Application Priority Data

Aug. 30, 1989 [JP] Japan ............................ 1-223567
Nov. 7, 1989 [JP] Japan ............................ 1-289501

[51] Int. Cl.⁵ .................... H04N 9/64; H04N 9/78
[52] U.S. Cl. ........................... 358/21 R; 358/31
[58] Field of Search ............. 35/21 R, 31, 10, 17, 35/18

[56] References Cited

U.S. PATENT DOCUMENTS 4,364,080 12/1982 Vidovic ............................ 358/10
4,646,151 2/1987 Welles, II. ....................... 358/31
4,772,938 9/1988 Sasson .......................... 358/21 R

FOREIGN PATENT DOCUMENTS 63-182572 7/1988 Japan .

*Primary Examiner*—Tommy P. Chin
*Attorney, Agent, or Firm*—Lowe, Price, LeBlanc & Becker

[57] ABSTRACT

An input analog signal is converted into a corresponding digital signal. A predetermined time segment of the digital signal is selected. A memory stores the selected time segment of the digital signal. A line counter counts horizontal scanning lines of an output video signal. The selected time segment of the digital signal is read out from the memory in synchronism with a horizontal sync signal in a direction of a time axis. An output signal from the line counter and the readout time segment of the digital signal are compared, and a video signal is generated which represents a waveform of a time segment of the input analog signal which corresponds to the selected time segment of the digital signal in synchronism with a vertical sync signal. The video signal is fed to the display section of the television receiver, and the waveform is indicated by the display section of the television receiver.

4 Claims, 10 Drawing Sheets

FIG. 5(a) Y 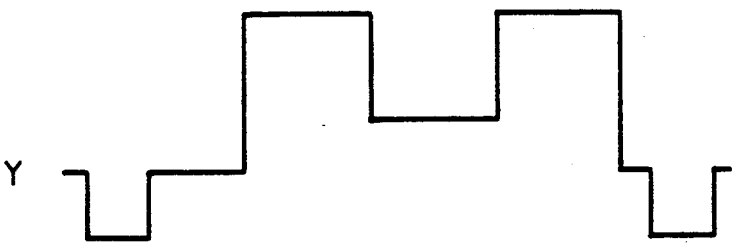
FIG. 5(b) Co 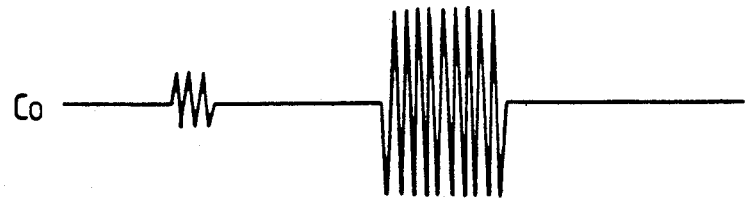
FIG. 5(c) C 

SIGNAL WAVEFORM DISPLAY DEVICE

This is a division, of application Ser. No. 07/570,250 filed Aug. 20, 1990.

BACKGROUND OF THE INVENTION

This invention relates to a device for enabling the waveform of a video signal to be indicated on a display part of a television receiver.

It is known to additionally equip a cathode-ray oscilloscope with a suitable device to enable the waveform of a television video signal to be indicated on the screen of the oscilloscope.

It is useful to indicate the waveform of a video signal on a display part of a television receiver.

SUMMARY OF THE INVENTION

It is an object of this invention to provide such a useful device for enabling the waveform of a video signal to be indicated on a display part of a television receiver.

According to a first aspect of this invention, a signal waveform display device for use with a display section of a television receiver comprises means for converting an input analog signal into a corresponding digital signal; means for selecting a predetermined time segment of the digital signal; means for storing the selected time segment of the digital signal; a line counter counting horizontal scanning lines of an output video signal; means for reading out the selected time segment of the digital signal from the storing means in synchronism with a horizontal sync signal in a direction of a time axis; means for comparing an output signal from the line counter and the readout time segment of the digital signal, and for generating a video signal which represents a waveform of a time segment of the input analog signal which corresponds to the selected time segment of the digital signal in synchronism with a vertical sync signal; and means for feeding the video signal to the display section of the television receiver and for enabling the waveform to be indicated by the display section of the television receiver.

According to a second aspect of this invention, a signal waveform display device for use with a display section of a television receiver comprises means for extracting a predetermined time segment of an analog video signal; means for converting the extracted time segment of the analog video signal into a corresponding digital video signal; means for storing the digital video signal; means for reading out the digital video signal from the storing means in synchronism with a horizontal sync signal of the analog video signal in a direction of a time axis, and for generating a waveform signal which represents a waveform of the extracted time segment of the analog video signal in synchronism with a vertical sync signal; and means for feeding the waveform signal to the display section of the television receiver and for enabling the waveform to be indicated by the display section of the television receiver.

According to a third aspect of this invention, a signal waveform display device comprises means for obtaining a signal C which is a resultant of detection of a color carrier signal of a composite color video signal; means for generates (Y+C) and (Y−C) analog signals from a luminance signal Y and the color detection signal C; means for converting the (Y+C) and (Y−C) analog signals into corresponding (Y+C) and (Y−C) digital signals; means for extracting predetermined time segments of the digital signals; a line counter counting horizontal scanning lines; means for comparing the extracted time segments of the digital signals, a reference value, and a value of the line counter; means for separating the composite color video signal into a chroma part and a non-chroma part; means for separating the non-chroma part into a first sub part between a setup and a signal value, and a second sub part between the setup and a sync signal; and means for indicating at least a portion of the chroma part, and the first and second sub non-chroma parts as a component of a predetermined color on the basis of a result of the comparing by the comparing means.

According to a fourth aspect of this invention, a signal generating device comprises means for converting an analog input video signal into a corresponding digital video signal; a memory storing a predetermined 1-horizontal line segment of the digital video signal; means for generating a 1-line segment of a video signal on the basis of the signal read out from the memory, wherein the generated 1-line segment of the video signal is an approximation of the input video signal; and means for repeatedly outputting the generated 1-line segment of the video signal during a plurlity of horizontal scanning periods.

According to a fifth aspect of this invention, a signal waveform display device for use with a display section of a television receiver comprises means for extracting a predetermined time segment of an input video signal; means for repeatedly outputting the extracted time segment of the input video signal at a period corresponding to a horizontal scanning period; means for generating a reference signal representing a reference value which varies stepwise each time a horizontal scanning period elapses and which varies from a first predetermined value to a second predetermined value during a vertical scanning period; means for comparing the repeatedly-outputted time segment of the input video signal with the reference signal, and thereby generating an output video signal which represents a waveform of the extracted time segment of the input video signal during a vertical scanning period; means for feeding the output video signal to the display section of the television receiver, and thereby enabling the waveform to be indicated by the display section of the television receiver.

BRIEF DESCRIPTION OF THE DRAWINGS

FIGS. 5(a) to 5(g) are diagrams showing the waveforms of various signals in the device of FIG. 3.

DESCRIPTION OF THE FIRST PREFERRED EMBODIMENT

Figure 1:
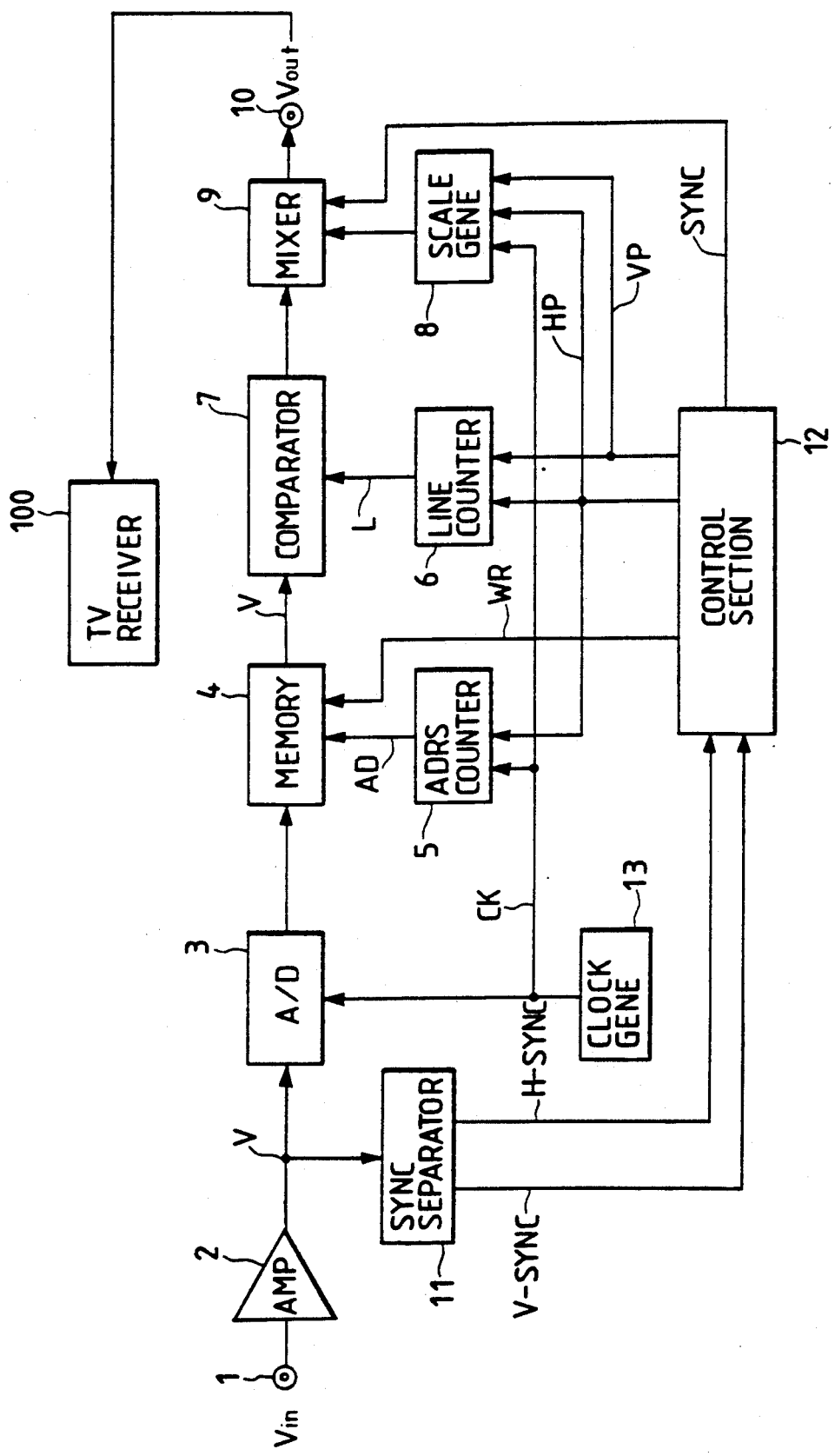
FIG. 1 is a block diagram of a signal waveform display device according to a first embodiment of this invention.

With reference to FIG. 1, an input video signal is fed via an input terminal 1 to an amplifier 2. After being amplified by the amplifier 2, the input video signal is fed to an analog-to-digital (A/D) converter 3 and a sync separator 11.

The A/D converter 3 samples the input video signal in response to a clock signal CK fed from a clock generator 13, and converts the sampled input video signal into a corresponding digital video signal. The digital video signal is applied from the A/D converter 3 to a memory 4.

The sync separator 11 separates a vertical sync signal V-SYNC and a horizontal sync signal H-SYNC from the input video signal. The vertical sync signal V-SYNC and the horizontal sync signal H-SYNC are fed from the sync separator 11 to a control section 12.

The control section 12 includes counters composing timing signal generators which generate various timing signals on the basis of the vertical sync signal V-SYNC and the horizontal sync signal H-SYNC. The control section 12 detects a predetermined horizontal line scanning period within each frame period by counting pulses of the vertical sync signal V-SYNC and the horizontal sync signal H-SYNC, and generates a write signal WR during the detected predetermined horizontal line scanning period. In the case of an interlaced video signal such as an NTSC signal, fields of different types are discriminated by counting pulses of the vertical sync signal V-SYNC and a predetermined horizontal line scanning period within an interval of each field of a given type is detected by counting pulses of the horizontal sync signal H-SYNC, and a write signal WR is generated during the detected predetermined horizontal line scanning period. The write signal WR is fed from the control section 12 to the memory 4.

The control section 12 includes wave-shaping circuits which convert the vertical sync signal V-SYNC and the horizontal sync signal H-SYNC into a corresponding fine-shape vertical sync pulse signal VP and a corresponding fine-shape horizontal sync pulse signal HP respectively.

An address counter 5 receives the clock signal CK and the horizontal sync signal HP from the clock generator 13 and the control section 12 respectively. The address counter 5 generates an address signal AD which is periodically updated in response to pulses of the clock signal CK and the horizontal sync signal HP. The address signal AD is fed from the address counter 5 to the memory 4.

During the predetermined horizontal line scanning period of each frame period, the memory 4 receives the write signal WR from the control section 12 so that time segments of the digital video signal are sequentially written into respective storage locations of the memory 4 which are designated by the address signal AD. In this way, the time segment of the digital video signal which corresponds to the predetermined horizontal line scanning period of each frame period is stored into the memory 4.

In the absence of the write signal WR, that is, in the case where the write signal WR is inactive or "0", the digital video signal is repeatedly read out from the memory 4 at a frequency corresponding to the horizontal scanning frequency of the input video signal. Specifically, during each of the horizontal scanning line periods within a 1-frame period and during the absence of the active write signal WR, the reading of the digital video signal from the memory 4 is enabled and the time segments of the video signal are sequentially read out from the respective storage locations of the memory 4 in accordance with the address signal AD fed from the address counter 5.

A line counter 6 includes a down counter whose output signal is reset to a state representative of a maximal value, for example, "255", by each pulse of the vertical sync signal VP fed from the control section 12. The value L represented by the output signal from the line counter 6 is decremented by "1" each time a pulse of the horizontal sync signal HP is fed to the line counter 6 from the control section 12.

A first input terminal of a comparator 7 receives data V corresponding to the digital video signal which is read out from the memory 4. The data V represent the level of the voltage of the input video signal. A second input terminal of the comparator 7 receives the output signal from the line counter 6 which represents the value L. As understood from the previous description, during each vertical scanning period, the value L initially equals the maximal value and then decreases one by one from the maximal value each time a horizontal scanning period elapses. The comparator 7 compares the data V and the value L, and outputs a given signal voltage only when the data V and the value L are equal. During each vertical scanning period, the comparator 7 usually outputs a plurality of given signal voltages which together represent the waveform of the extracted 1-line part of the input video signal. Thus, the signal voltages outputted from the comparator 7 compose a waveform signal. The waveform signal is fed from the comparator 7 to a first input terminal of a mixer 9.

A scale signal generator 8 generates a scale signal in response to the clock signal CK fed from the clock generator 13, and the horizontal sync signal HP and the vertical sync signal VP fed from the control section 12. The scale signal represents numerals and lines denoting a predetermined scale. The scale signal is fed from the scale signal generator 8 to a second input terminal of the mixer 9.

The control section 12 includes a signal generator which generates a sync signal SYNC for the waveform signal on the basis of the horizontal sync signal H-SYNC and the vertical sync signal V-SYNC. The sync signal SYNC is fed from the control section 12 to a third input terminal of the mixer 9.

The mixer 9 mixes the waveform signal, the scale signal, and the sync signal SYNC into a composite video signal (a television signal). The composite video signal is outputted from the mixer 9 and is then transmitted via an output terminal 10.

The output terminal 10 is connected to a video input terminal of a television receiver 100 so that the composite video signal is fed to the television receiver 100. In this case, a picture represented by the composite video signal is indicated on the display part of the television receiver 100. Since the composite video signal represents the waveform and the predetermined scale given by the output signals from the devices 7 and 8, the indicated picture includes the waveform and the predetermined scale.

Figure 2:
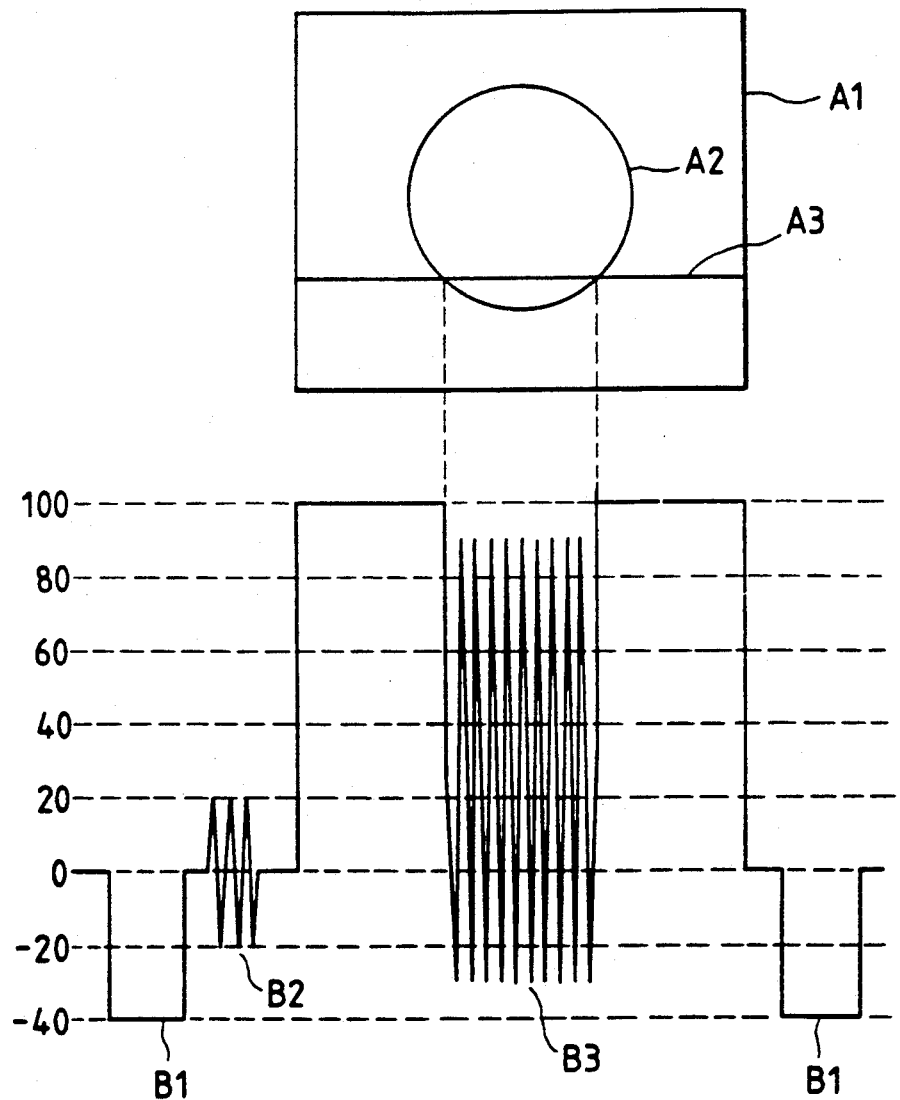
FIG. 2 is a diagram showing an example of the picture represented by a video signal inputted into the device of FIG. 1, and also an example of the waveform of the input video signal which is indicated by the device of FIG. 1.

The upper part of FIG. 2 shows an example of a complete image represented by the input video signal. The image in the upper part of FIG. 2 includes a white rectangle A1 in which a red circle A2 extends. The lower part of FIG. 2 shows an example of the indicated picture which is obtained for the 1-line part of the input video signal corresponding to a scanning line A3 in the upper part of FIG. 2. The scanning line A3 passes through a left-hand region of the white rectangle A1 and then extends across the red circle A2, passing through a right-hand region of the white rectangle A1. As shown in the lower part of FIG. 2, the indicated picture includes a scale represented by numerals and broken lines which are given by the scale signal. In addition, the indicated picture shows a waveform given by the waveform signal. The shown waveform has parts B1, B2, and B3 representing a horizontal sync signal, a color burst signal, and a color carrier respectively. The color carrier in the part B3 corresponds to "red" of the red circle A2. In the lower part of FIG. 2, the abscissa denotes a time and the indicated time interval is equal to about a 1-H period, and the ordinate denotes a voltage and the numerals represent the voltage scale expressed in unit of an IRE notation.

Figure 11:
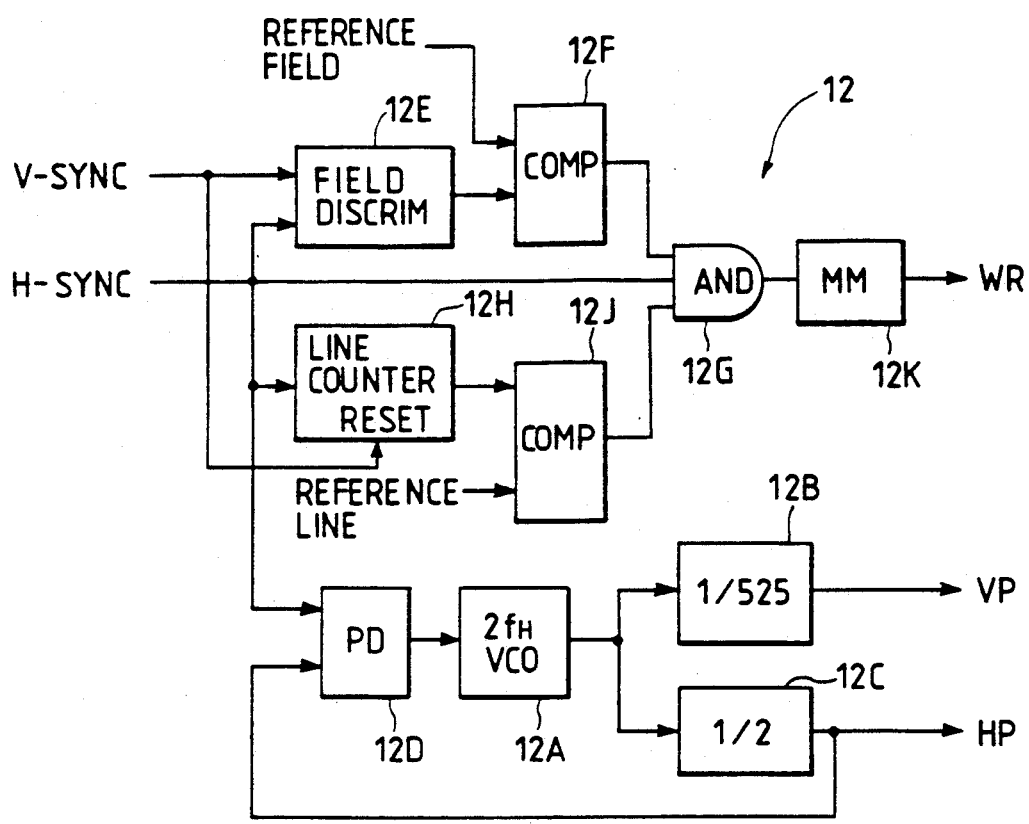
FIG. 11 is a block diagram of the control section of FIG. 1.

FIG. 11 shows a main part of the control section 12. The control section 12 includes a voltage-controlled oscillator 12A which oscillates at a frequency twice the horizontal sync frequency fH of the indicated video signal. A frequency divider 12B divides the frequency of the output signal of the voltage-controlled oscillator 12A by 525 and thereby derives the vertical sync signal VP. A frequency divider 12C divides the frequency of the output signal of the voltage-controlled oscillator 12A by 2 and thereby derives the horizontal sync signal HP. A phase detector 12D compares the phase of the horizontal sync signal H-SYNC of the input video signal and the phase of the horizontal sync signal HP outputted from the frequency divider 12C. The output voltage from the phase detector 12D is fed to the voltage-controlled oscillator 12A as a control voltage. The phase detector 12D, the voltage-controlled oscillator 12A, and the frequency divider 12C form a phase-locked loop so that the frequency of the horizontal sync signal HP accurately agrees with the frequency of the horizontal sync signal H-SYNC of the input video signal.

As shown in FIG. 11, the control section 12 includes a field discriminator 12E which detects whether the current field of the input video signal is even or odd by referring to the horizontal sync signal H-SYNC and the vertical sync signal V-SYNC of the input video signal. The output signal from the field discriminator 12E is compared with a signal representative of a reference field by a comparator 12F. The output signal from the comparator 12F is applied to a first input terminal of an AND gate 12G. The horizontal sync signal H-SYNC of the input video signal is applied to a second input terminal of the AND gate 12G. A line counter 12H counts pulses of the horizontal sync signal H-SYNC of the input video signal. The line counter 12H is reset by each pulse of the vertical sync signal V-SYNC of the input video signal. The output signal from the line counter 12H is compared with a signal representative of a reference line by a comparator 12J. The output signal from the comparator 12J is applied to a third input terminal of the AND gate 12G. When the current line and the current field of the input video signal agree with the reference line and the reference field respectively, the AND gate 12G is opened by the output signals from the comparators 12F and 12J so that a pulse of the horizontal sync signal H-SYNC of the input video signal is transmitted through the AND gate 12G to a monostable multivibrator 12K. The monostable multivibrator 12K is triggered by the pulse of the horizontal sync signal H-SYNC, and generates the write signal WR having a predetermined duration corresponding to, for example, one horizontal period.

Figure 12:
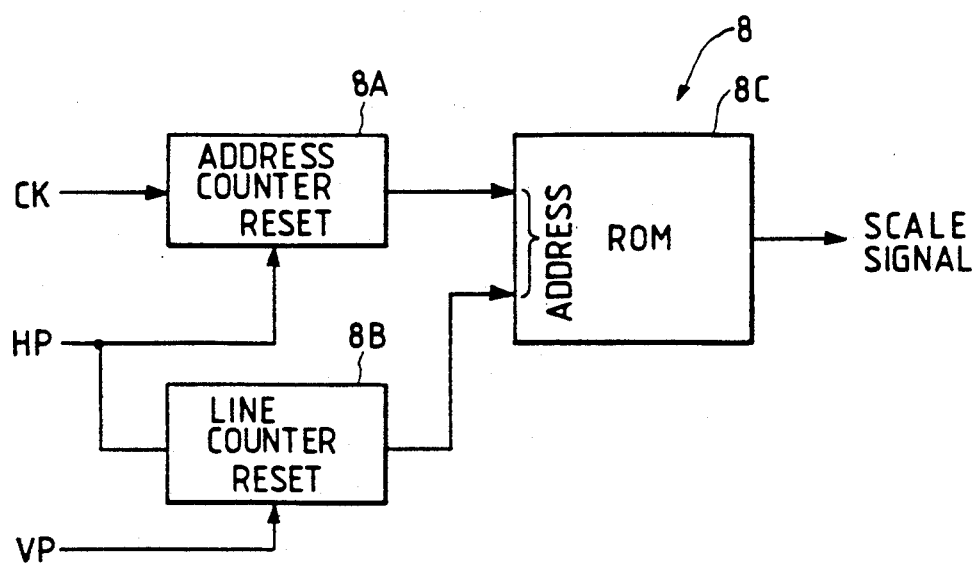
FIG. 12 is a block diagram of the scale signal generator of FIG. 1.

FIG. 12 shows the scale signal generator 8. The scale signal generator 8 includes an address counter 8A counts pulses of the clock signal CK. The address counter 8A is reset by each pulse of the horizontal sync signal HP. A line counter 8B counts pulses of the horizontal sync signal HP. The line counter 8B is reset by each pulse of the vertical sync signal VP. The output signals from the address counter 8A and the line counter 8B compose an address signal fed to a ROM 8C. The ROM 8C is previously loaded with data representing the predetermined scale. The scale data are read out from the ROM 8C in response to the address signal. The readout scale data are used as the scale signal.

DESCRIPTION OF THE SECOND PREFERRED EMBODIMENT

Figure 3:
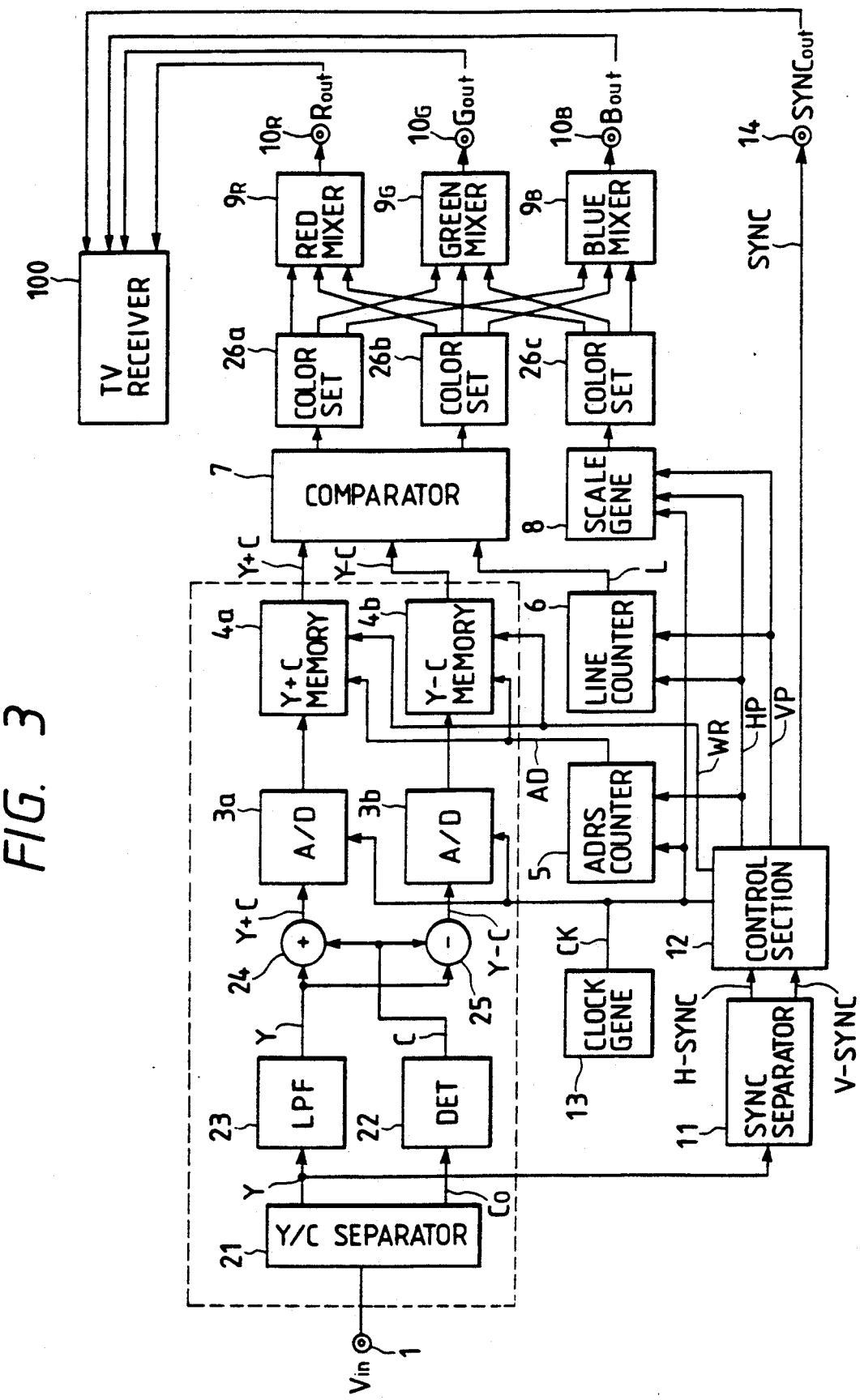
FIG. 3 is a block diagram of a signal waveform display device according to a second embodiment of this invention.

With reference to FIG. 3, an input video signal is fed via an input terminal 1 to a Y-signal/C-signal (Y/C) separator 21. The input video signal is separated by the Y/C separator 21 into a luminance signal Y and a color subcarrier Co. Examples of the waveforms of the luminance signal Y and the color subcarrier Co are shown in the parts (a) and (b) of FIG. 5 respectively.

The color subcarrier Co outputted from the Y/C separator 21 is subjected to peak detection by a chroma detector 22 so that a chroma signal C is derived from the color subcarrier Co. The chroma signal C represents the amplitude of the color subcarrier Co. An example of the waveform of the chroma signal C is shown in the part (c) of FIG. 5. The chroma signal C is fed to first input terminals of an adder 24 and a subtracter 25.

The luminance signal Y outputted from the Y/C separator 21 is processed by a low pass filter 23. The low pass filter 23 removes unwanted high-frequency components from the luminance signal Y. In addition, the low pass filter 23 includes a delay circuit which delays the luminance signal Y by a time corresponding to the chroma-signal delay caused in the chroma detector 22. The luminance signal Y is fed from the low pass filter 23 to second input terminals of the adder 24 and the subtracter 25.

The adder 24 adds the luminance signal Y and the chroma signal C, and thereby generates a (Y+C) signal. An example of the waveform of the (Y+C) signal is shown in the part (d) of FIG. 5. The subtracter 25 subtracts the chroma signal C from the luminance signal Y, and thereby generates a (Y−C) signal. An example of the waveform of the (Y−C) signal is shown in the part (e) of FIG. 5.

The (Y+C) signal outputted from the adder 24 is fed to an analog-to-digital (A/D) converter 3a. The A/D converter 3a samples the (Y+C) signal in response to a clock signal CK fed from a clock generator 13, and converts the sampled signal into a corresponding digital (Y+C) signal having 8 bits for example. The digital (Y+C) signal is applied from the A/D converter 3a to a memory 4a.

The (Y−C) signal outputted from the subtracter 25 is fed to an analog-to-digital (A/D) converter 3b. The A/D converter 3b samples the (Y−C) signal in response to the clock signal CK fed from the clock generator 13, and converts the sampled signal into a corresponding digital (Y−C) signal having 8 bits for example. The digital (Y−C) signal is applied from the A/D converter 3b to a memory 4b.

The luminance signal Y outputted from the Y/C separator 21 is also fed to a sync separator 11. The sync separator 11 separates a vertical sync signal V-SYNC and a horizontal sync signal H-SYNC from the luminance signal Y. The vertical sync signal V-SYNC and the horizontal sync signal H-SYNC are fed from the sync separator 11 to a control section 12.

The control section 12 receives the clock signal CK from the clock generator 13. The control section 12 includes counters composing timing signal generators which generate various timing signals on the basis of the vertical sync signal V-SYNC, the horizontal sync signal H-SYNC, and the clock signal CK. The control section 12 detects a predetermined horizontal line scanning period within each frame period by counting pulses of the vertical sync signal V-SYNC and the horizontal sync signal H-SYNC, and generates a write signal WR during the detected predetermined horizontal line scanning period. In the case of an interlaced video signal such as an NTSC signal, fields of different types are discriminated by counting pulses of the vertical sync signal V-SYNC and a predetermined horizontal line scanning period within an interval of each field of a given type is detected by counting pulses of the horizontal sync signal H-SYNC, and a write signal WR is generated during the detected predetermined horizontal line scanning period. The write signal WR is fed from the control section 12 to the memories 4a and 4b.

The control section 12 includes wave-shaping circuits which convert the vertical sync signal V-SYNC and the horizontal sync signal H-SYNC into a corresponding fine-shape vertical sync pulse signal VP and a corresponding fine-shape horizontal sync pulse signal HP respectively.

An address counter 5 receives the clock signal CK and the horizontal sync signal HP from the clock generator 13 and the control section 12 respectively. The address counter 5 generates an address signal AD which are periodically updated in response to pulses of the clock signal CK and the horizontal sync signal HP. The address signal AD is fed from the address counter 5 to the memories 4a and 4b.

During the predetermined horizontal line scanning period of each frame period, the memory 4a receives the write signal WR from the control section 12 so that time segments of the digital (Y+C) signal are sequentially written into respective storage locations of the memory 4a which are designated by the address signal AD. In this way, the time segment of the digital (Y+C) signal which corresponds to the predetermined horizontal line scanning period of each frame period is stored into the memory 4a.

Similarly, during the predetermined horizontal line scanning period of each frame period, the memory 4b receives the write signal WR from the control section 12 so that time segments of the digital (Y−C) signal are sequentially written into respective storage locations of the memory 4b which are designated by the address signal AD. In this way, the time segment of the digital (Y−C) signal which corresponds to the predetermined horizontal line scanning period of each frame period is stored into the memory 4b.

In the absence of the write signal WR, that is, in the case where the write signal WR is inactive or "0", the digital (Y+C) signal is repeatedly read out from the memory 4a at a frequency corresponding to the horizontal scanning frequency of the input video signal. Specifically, during each of the horizontal scanning line periods within a 1-frame period and during the absence of the active write signal WR, the reading of the digital (Y+C) signal from the memory 4a is enabled and the time segments of the (Y+C) signal are sequentially read out from the respective storage locations of the memory 4a in accordance with the address signal AD fed from the address counter 5.

Similarly, in the absence of the active write signal WR, the digital (Y−C) signal is repeatedly read out from the memory 4b at a frequency corresponding to the horizontal scanning frequency of the input video signal. Specifically, during each of the horizontal scanning line periods within a 1-frame period and during the absence of the active write signal WR, the reading of the digital (Y−C) signal from the memory 4b is enabled and the time segments of the (Y−C) signal are sequentially read out from the respective storage locations of the memory 4b in accordance with the address signal AD fed from the address counter 5.

A line counter 6 includes a down counter whose output signal is reset to a state representative of a maximal value, for example, "255", by each pulse of the vertical sync signal VP fed from the control section 12. The value L represented by the output signal from the line counter 6 is decremented by "1" each time a pulse of the horizontal sync signal HP is fed to the line counter 6 from the control section 12.

A first input terminal of a comparator 7 receives the digital (Y+C) signal which is read out from the memory 4a. A second input terminal of the comparator 7 receives the digital (Y−C) signal which is read out from the memory 4b. A third input terminal of the comparator 7 receives the output signal from the line counter 6 which represents the value L. As understood from the previous description, during each vertical scanning period, the value L initially equals the maximal value and then decreases one by one from the maximal value each time a horizontal scanning period elapses. The comparator 7 compares the data (Y+C), the data (Y−C), and the value L to detect a chroma signal part and a non-chroma signal part.

Figure 4:
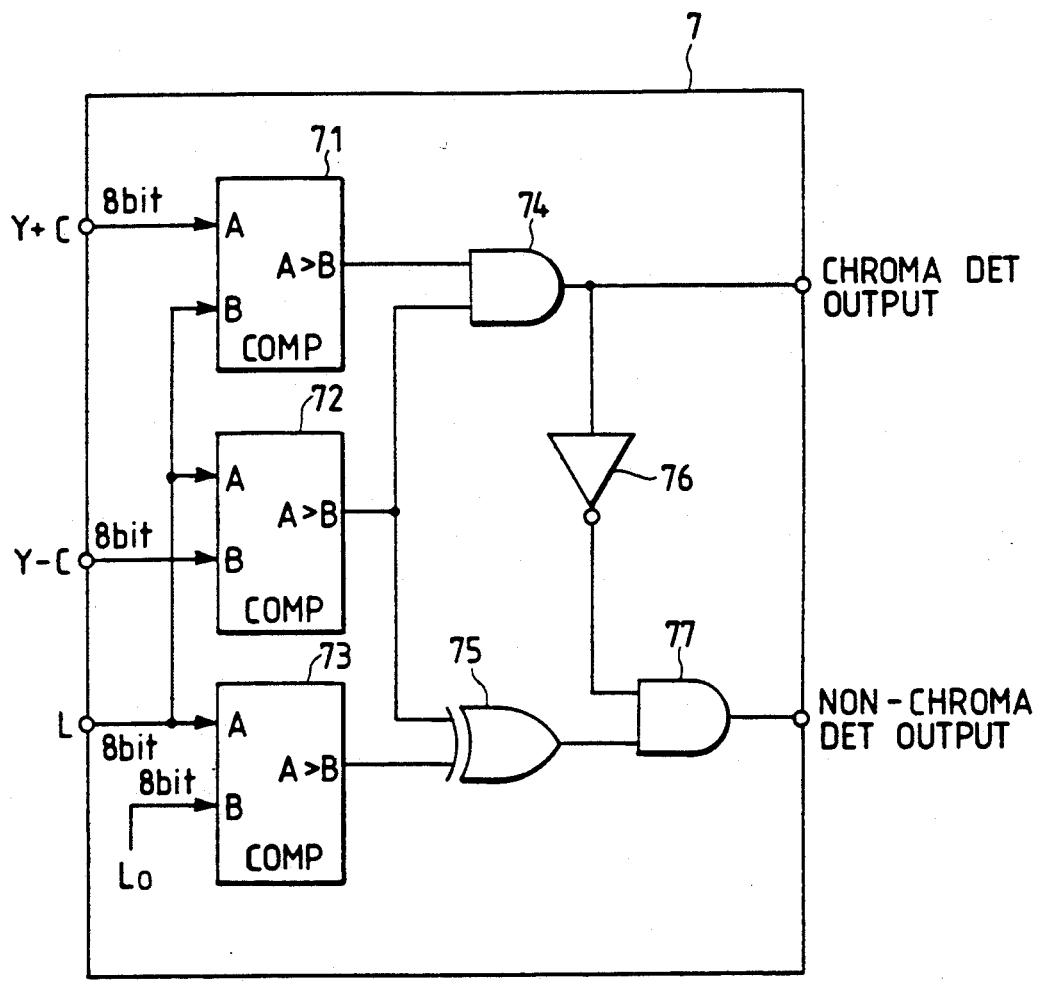
FIG. 4 is a block diagram of the comparator of FIG. 3.
Figure 5D:
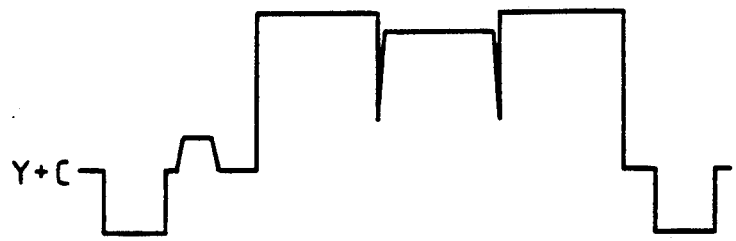
Figure 5E:
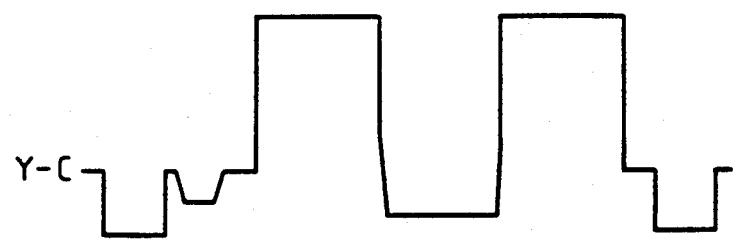
Figure 5F:
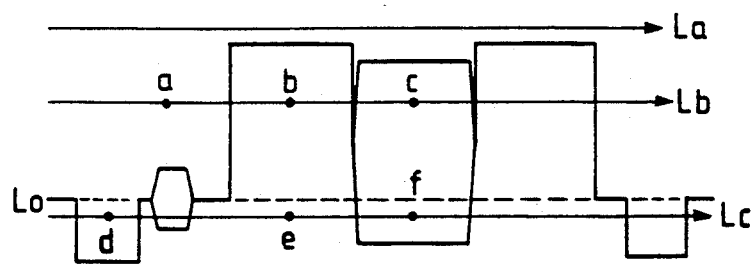
Figure 5G:
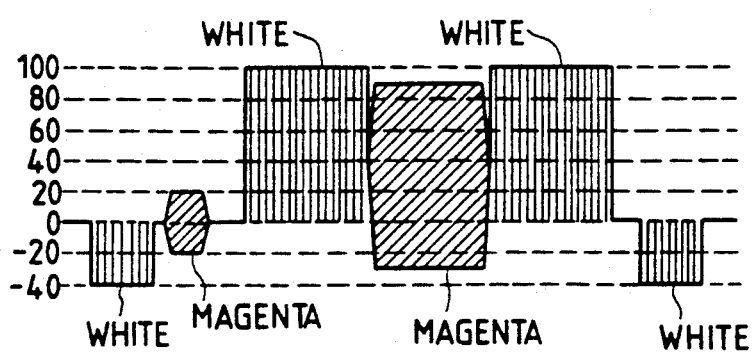

As shown in FIG. 4, the comparator 7 includes comparing circuits 71-73, AND circuits 74 and 77, an EXCLUSIVE-OR circuit 75, and an inverter 76. In addition, comparator 7 includes a reference signal generator (not shown) generating a reference digital signal representative of a predetermined reference value Lo. For example, the data (Y+C), the data (Y−C), the data L, and the data Lo have eight bits. The comparing circuit 71 compares the data (Y+C) and the data L. When the data (Y+C) are larger than the data L, the comparing circuit 71 outputs a "1" signal to a first input terminal of the AND circuit 74. Otherwise, the comparing circuit 71 outputs a "0" signal to the first input terminal of the AND circuit 74. The comparing circuit 72 compares the data (Y−C) and the data L. When the data L are larger than the data (Y−C), the comparing circuit 72 outputs a "1" signal to a second input terminal of the AND circuit 74 and a first input terminal of the EXCLUSIVE-OR circuit 75. Otherwise, the comparing circuit 72 outputs a "0" signal to the second input terminal of the AND circuit 74 and the first input terminal of the EXCLUSIVE-OR circuit 75. The comparing circuit 73 compares the data L and the data Lo. When the data L are larger than the data Lo, the comparing circuit 73 outputs a "1" signal to a second input terminal of the EXCLUSIVE-OR circuit 75. Otherwise, the comparing circuit 73 outputs a "0" signal to the second input terminal of the EXCLUSIVE-OR circuit 75. When both of the output signals from the comparing circuits 71 and 72 are "1", the AND circuit 74 outputs a "1" signal. Otherwise, the AND circuit 74 outputs a "0" signal. The output signal from the AND circuit 74 is used as a chroma-part detection signal which is outputted to a chroma-part color setting circuit 26a (see FIG. 3). The output signal from the AND circuit 74 is fed to the inverter 76. The output signal from the inverter 76 is applied to a first input terminal of the AND circuit 77. When the output signals from the comparing circuits 72 and 73 are logically different, the EXCLUSIVE-OR circuit 75 outputs a "1" signal to a second input terminal of the AND circuit 77. Otherwise, the EXCLUSIVE-OR circuit 75 outputs a "0" signal to the second input terminal of the AND circuit 77. When the output signals from the inverter 76 and the EXCLUSIVE-OR circuit 75 are "1", the AND circuit 77 outputs a "1" signal. Otherwise, the AND circuit 77 outputs a "0" signal. The output signal from the AND circuit 77 is used as a non-chroma-part detection signal which is outputted to a non-chroma-part color setting circuit 26b (see FIG. 3).

In the case where the data L lie between the data (Y+C) and the data (Y−C), that is, in the case where the following relation (1)

$$(Y+C) > L > (Y-C) \quad (1)$$

is satisfied, both of the output signals from the comparing circuits 71 and 72 are "1" so that the AND circuit 74 outputs a "1" chroma-part detection signal.

In the case where L>Lo and L<(Y−C), the output signals from the comparing circuits 72 and 73 are logically different so that the EXCLUSIVE-OR circuit 75 outputs a "1" signal to the AND circuit 77. In the case where L<Lo and L>(Y−C), the output signals from the comparing circuits 72 and 73 are logically different so that the EXCLUSIVE-OR circuit 75 outputs a "1" signal to the AND circuit 77. Portions of the "1" output signal from the EXCLUSIVE-OR circuit 75 are masked by the combination of the AND circuit 77 and the inverter 76 in response to the chroma-part detection signal. As a result, the AND circuit 77 outputs a "1" non-chroma-part detection signal when one of the following relations (2) and (3) is satisfied.

$$L > Lo \text{ and } L < (Y-C) \quad (2)$$

$$L < Lo \text{ and } L > (Y+C) \quad (3)$$

The part (f) of FIG. 5 shows a waveform which is obtained by overlapping the waveforms (d) and (e). During a horizontal line scanning interval where the data L equals a given value La, none of the relations (1)–(3) is satisfied as understood from the part (f) of FIG. 5. Accordingly, in this case, both of a "1" chroma-part detection signal and a "1" non-chroma-part detection signal are absent. During a horizontal line scanning interval where the data L equals a given value Lb: none of the relations (1)–(3) is satisfied and both of a "1" chroma-part detection signal and a "1" non-chroma-part detection signal are absent at the point "a"; the relation (2) is satisfied and a "1" non-chroma-part detection signal is present at the point "b"; and the relation (1) is satisfied and a "1" chroma-part detection signal is present at the point "c". During a horizontal line scanning interval where the data L equals a given value Lc: the relation (3) is satisfied and a "1" non-chroma-part detection signal is present at the point "d"; none of the relations (1)–(3) is satisfied and both of a "1" chroma-part detection signal and a "1" non-chroma-part detection signal are absent at the point "e"; and the relation (1) is satisfied and a "1" chroma-part detection signal is present at the point "f".

During each vertical scanning period, the comparator 7 usually outputs a plurality of "1" chroma-part detection signals which together represent the waveform of the chroma part of the extracted 1-line portion of the input video signal. Thus, the "1" chroma-part detection signals outputted from the comparator 7 compose a chroma-part waveform signal. Similarly, during each vertical scanning period, the comparator 7 usually outputs a plurality of "1" non-chroma-part detection signals which together represent the waveform of the non-chroma part of the extracted 1-line portion of the input video signal. Thus, the "1" non-chroma-part detection signals outputted from the comparator 7 compose a non-chroma-part waveform signal. Indicated colors of the chroma-part waveform signal and the non-chroma-part waveform signal are determined by the color setting circuits 26a and 26b respectively.

A scale signal generator 8 generates a scale signal in response to the clock signal CK fed from the clock generator 13, and the horizontal sync signal HP and the vertical sync signal VP fed from the control section 12. The scale signal represents numerals and lines denoting a predetermined scale. The scale signal is fed from the scale signal generator 8 to a scale color setting circuit 26c. An indicated color of the scale signal is determined by the color setting circuit 26c.

Red output signals from the color setting circuits 26a–26c are mixed by a mixer 9R into an R signal. The R signal outputted from the mixer 9R is transmitted via an output terminal 10R. Green output signals from the color setting circuits 26a–26c are mixed by a mixer 9G into a G signal. The G signal outputted from the mixer 9G is transmitted via an output terminal 10G. Blue output signals from the color setting circuits 26a–26c are mixed by a mixer 9B into a B signal. The B signal outputted from the mixer 9B is transmitted via an output terminal 10B.

The R signal, the G signal, and the B signal are fed to a display part of a color television receiver 100 so that a picture represented by these signals is indicated on a display screen of the color television receiver 100. The part (g) of FIG. 5 shows an example of the indicated picture which corresponds to the waveform of the part (f) of FIG. 5. Since the R signal, the G signal, and the B signal represent the waveform and the predetermined scale given by the output signals from the devices 7 and 8, the indicated picture includes the waveform and the predetermined scale. The scale in the indicated picture is represented by numerals and broken lines which are given by the scale signal. In addition, the indicated picture shows a waveform which is separated into chroma parts and non-chroma parts in correspondence with the chroma-part waveform signal and the non-chroma-part waveform signal. In the example of the part (g) of FIG. 5, the chroma parts of the waveform are colored magenta while the non-chroma parts of the waveform are made white.

The non-chroma parts of the waveform are separated into two types which can be discriminated by use of a reference line represented by the scale numeral "0". The non-chroma parts which extend above the reference line "0" represent a luminance signal. The non-chroma parts which extend below the reference line "0" represent a sync signal. In this way, the sync signal, the luminance signal, and the chroma signal can be easily discriminated with respect to the indicated picture.

DESCRIPTION OF THE THIRD PREFERRED EMBODIMENT

Figure 6:
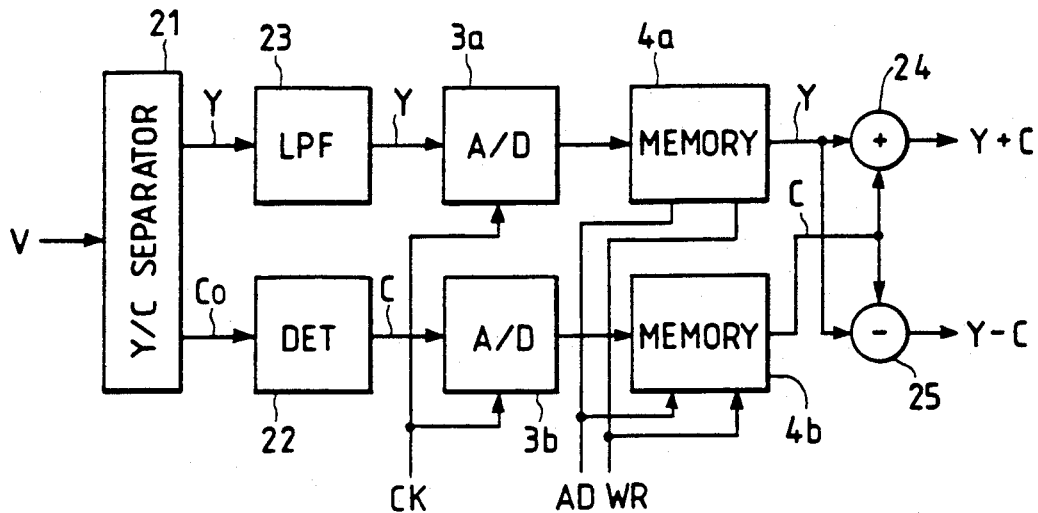
FIG. 6 is a block diagram of part of a signal waveform display device according to a third embodiment of this invention.

FIG. 6 shows a third embodiment of this invention which is similar to the embodiment of FIGS. 3-5 except for the following design change. In the embodiment of FIG. 6, a luminance signal Y and a detected chroma signal C are subjected to A/D conversion by A/D converters 3a and 3b and digitized signals Y and C are read out from memories 4a and 4b, and then addition and subtraction to produce data (Y+C) and data (Y−C) are executed by an adder 24 and a subtracter 25.

DESCRIPTION OF THE FOURTH PREFERRED EMBODIMENT

Figure 7:
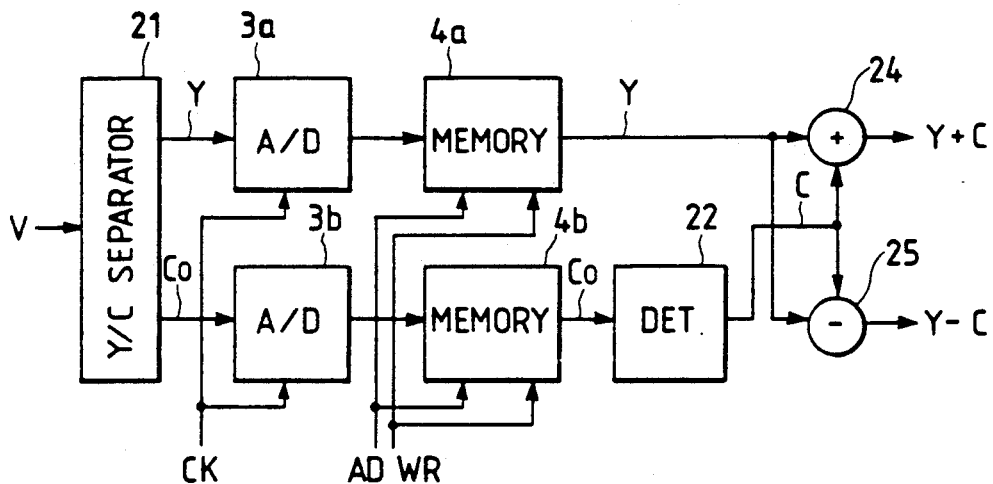
FIG. 7 is a block diagram of part of a signal waveform display device according to a fourth embodiment of this invention.

FIG. 7 shows a fourth embodiment of this invention which is similar to the embodiment of FIGS. 3-5 except for the following design change. In the embodiment of FIG. 7, a luminance signal Y and a chroma signal C are subjected to A/D conversion by A/D converters 3a and 3b and digitized signals Y and C are read out from memories 4a and 4b, and then detection of the chroma signal C is executed by a detector 22 and addition and subtraction to produce data (Y+C) and data (Y−C) are executed by an adder 24 and a subtracter 25.

DESCRIPTION OF THE FIFTH PREFERRED EMBODIMENT

Figure 8:
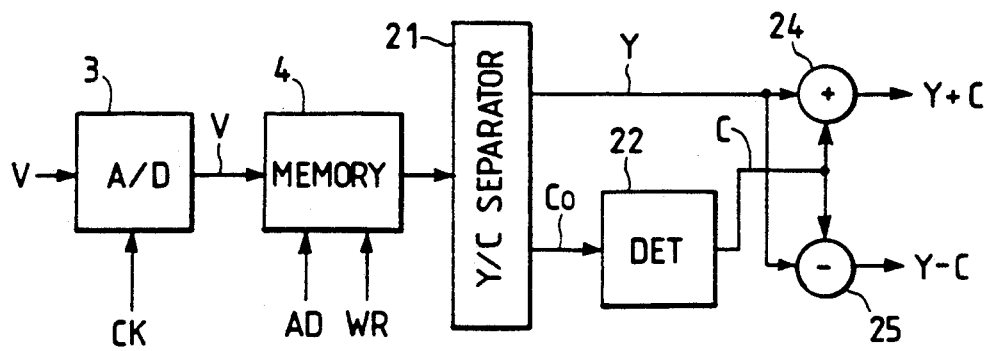
FIG. 8 is a block diagram of part of a signal waveform display device according to a fifth embodiment of this invention.

FIG. 8 shows a fifth embodiment of this invention which is similar to the embodiment of FIGS. 3-5 except for the following design change. In the embodiment of FIG. 8, a composite signal V is subjected to A/D conversion by an A/D converter 3 and digitized composite signal is read out from a memory 4, and then Y/C separation, detection of a chroma signal, the operation of Y+C, and the operation of Y−C are executed.

DESCRIPTION OF THE SIXTH PREFERRED EMBODIMENT

Figure 9:
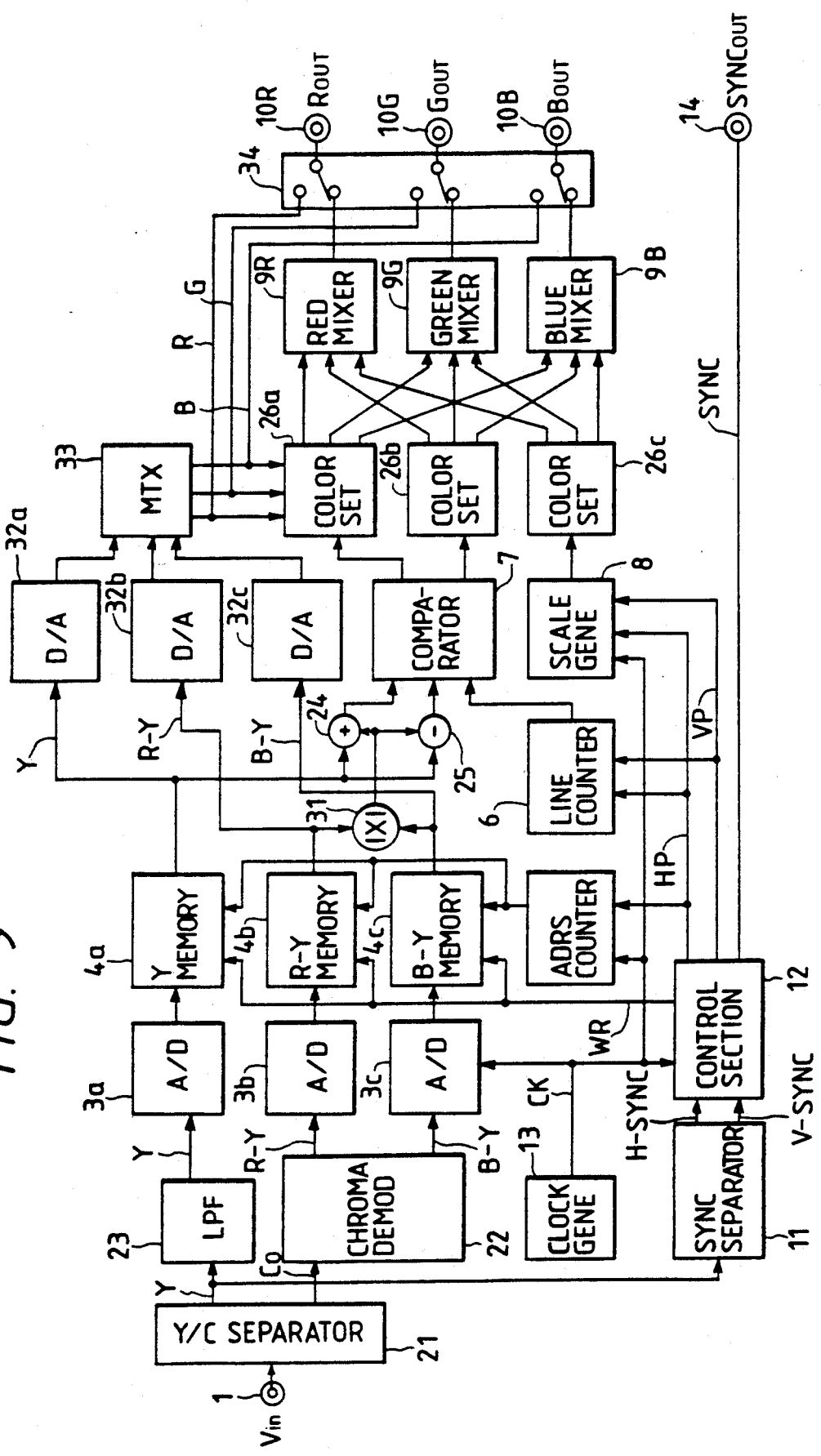
FIG. 9 is a block diagram of a signal waveform display device according to a sixth embodiment of this invention.

FIG. 9 shows a sixth embodiment of this invention which is similar to the embodiment of FIGS. 3-5 except for design changes indicated hereinafter.

In the embodiment of FIG. 9, a chroma demodulator 22 derives color difference signals, that is, an (R−Y) signal and a (B−Y) signal, from a color subcarrier C. The (R−Y) signal and the (B−Y) signal are converted by A/D converters 3b and 3c into corresponding digital (R−Y) and (B−Y) signals, which are inputted into memories 4b and 4c respectively.

A multiplier 31 multiplies the (R−Y) signal and the (B−Y) signal, and derives the absolute value of the result of the multiplication. The output signal from the multiplier 31 corresponds to a detected chroma signal C of the embodiment of FIGS. 3-5.

The luminance signal Y, the (R−Y) signal, and the (B−Y) signal which are read out from memories 4a, 4b, and 4c are converted by D/A (digital-to-analog) converters 32a, 32b, and 32c into corresponding analog signals respectively. A matrix circuit 33 derives primary color signals (R, G, and B signals) from the output signals of the D/A converters 32a, 32b, and 32c. The R, G, and B signals are fed to a chroma-part color setting circuit 26a, and a color of chroma parts is determined on the basis of the R, G, and B signals.

The R, G, and B signals are also fed to a change circuit 34. The change circuit 34 selects a set of the R, G, and B signals or a set of output signals from mixers 9R, 9G, and 9B in response to a control signal fed from a control section 12. The selected signals are transmitted to output terminals 10R, 10G, and 10B.

A Y/C separator 21 extracts a color subcarrier C from an input composite video signal V. The (R−Y) signal and the (B−Y) signal are demodulated by the chroma demodulator 22. As described previously, the (R−Y) signal and the (B−Y) signal are converted by the A/D converters 4b and 4c into the corresponding digital (R−Y) and (B−Y) signals, which are stored into the memories 4b and 4c. The digital (R−Y) signal and the digital (B−Y) signal which are read out from the memories 4b and 4c are multiplied by the multiplier 31, and the absolute value of the result of this multiplication is obtained by the multiplier 31. As described previously, the output signal from the multiplier 31 corresponds to the detected chroma signal C of the embodiment of FIGS. 3-5. A comparator 7 outputs a chroma-part waveform signal and a non-chroma part waveform signal as in the embodiment of FIGS. 3-5. The luminance signal Y, the (R−Y) signal, and the (B−Y) signal which are read out from the memories 4a, 4b, and 4c are converted by the D/A converters 32a, 32b, and 32c into the corresponding analog signals respectively. The matrix circuit 33 derives the R, G, and B signals from the output signals of the D/A converters 32a, 32b, and 32c. This process means that the 1-line part of the video signal which is stored into the memories is reproduced as it is. The reproduced R, G, and B color signals are fed from the matrix circuit 33 to the chroma-part color setting circuit 26a, and the color of the chroma parts is determined on the basis of the R, G, and B signals.

The R, G, and B signals can be outputted via the change circuit 34. In this case, the contents of the 1-line part of the input video signal are repeatedly indicated on the entire region of the display screen of a color television receiver for all the horizontal scanning lines composing a field or a frame.

Accordingly, a color burst signal and a multi burst signal added during a vertical blanking period can be monitored on the entire region of the display screen. This process can be used in checking the display part of the television receiver.

DESCRIPTION OF THE SEVENTH PREFERRED EMBODIMENT

Figure 10:
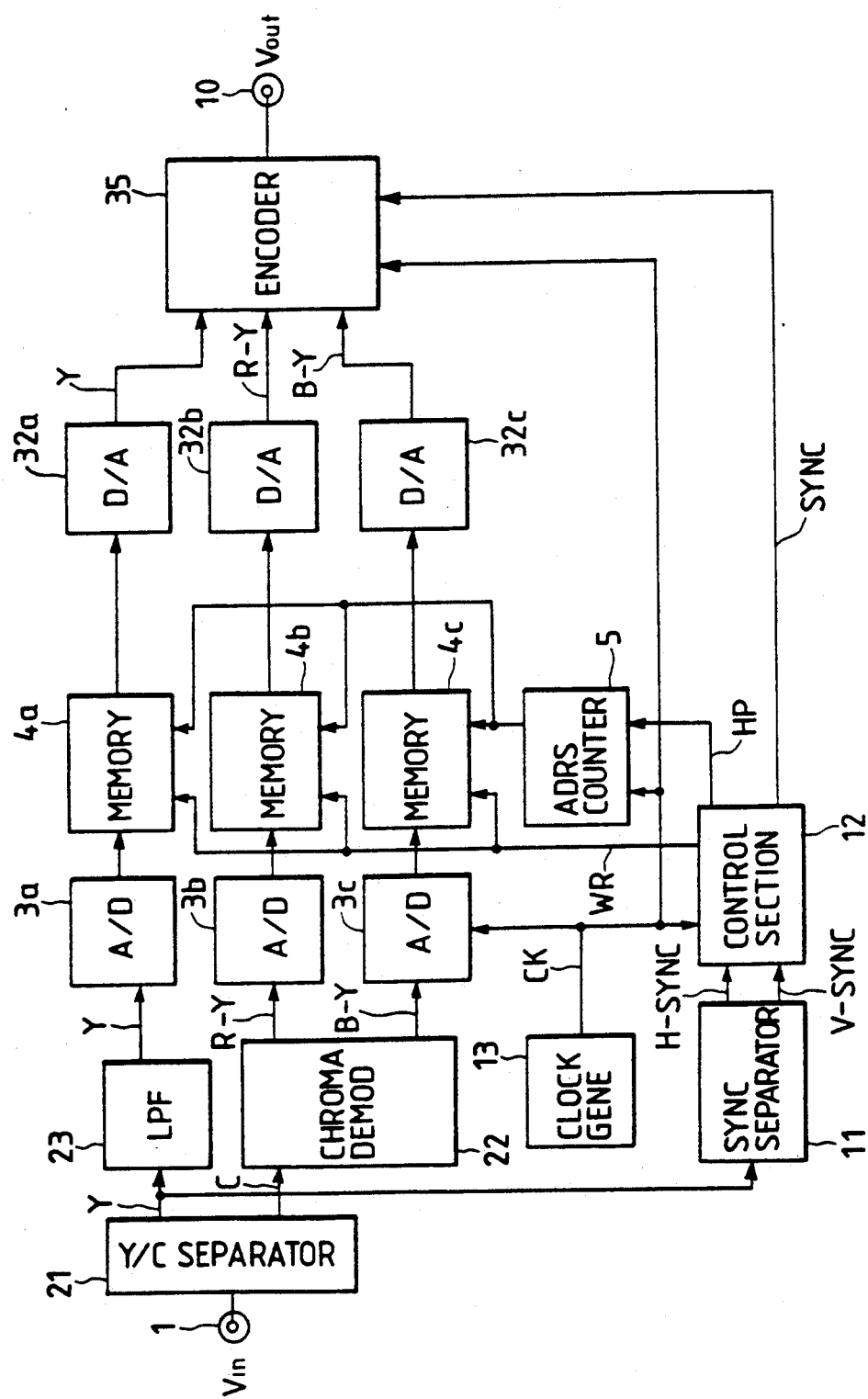
FIG. 10 is a block diagram of a signal waveform display device according to a seventh embodiment of this invention.

FIG. 10 shows a seventh embodiment of this invention which is similar to the embodiment of FIG. 9 except for the following design changes. The sections for deriving the chroma-part waveform signal, the non-chroma-part waveform signal, and the scale signal are removed from the embodiment of FIG. 10. In the embodiment of FIG. 10, an encoder 35 generate a composite video signal from the output signals of D/A converters 32a, 32b, and 32c. The composite video signal outputted from the encoder 35 is transmitted via an output terminal 10.

What is claimed is:

1. A signal waveform display device comprising:
   means for obtaining a signal C which is a resultant of detection of a color carrier signal of a composite color video signal;
   means for generates (Y+C) and (Y−C) analog signals from a luminance signal Y and the color detection signal C;
   means for converting the (Y+C) and (Y−C) analog signals into corresponding (Y+C) and (Y−C) digital signals;
   means for extracting predetermined time segments of the digital signals;
   a line counter counting horizontal scanning lines;
   means for comparing the extracted time segments of the digital signals, a reference value, and a value of the line counter;
   means for separating the extracted time segment of the digital signals into a chroma part and a non-chroma part;
   means for separating the non-chroma part into a first sub part between a setup and a signal value, and a second sub part between the setup and a sync signal; and
   means for indicating at least a portion of the chroma part, and the first and second sub non-chroma parts as a component of a predetermined color on the basis of a result of the comparing by the comparing means.

2. The signal waveform display device of claim 1 wherein the comparing means comprises a first digital comparator receiving the (Y+C) signal and the line counter value, a second digital counter receiving the (Y−C) signal and the line counter value, a third digital comparator comparing the line counter value and the reference value, means for executing an AND operation between output signals from the first and second digital comparators, means for executing an EXCLUSIVE-OR operation between output signals from the second and third digital comparators, means for outputting an active chroma signal on the basis of an output signal from the AND means when the line counter value is smaller than the (Y+C) signal but larger than the (Y−C) signal, and means for outputting an active non-chroma signal on the basis of outputs signals from the EXCLUSIVE-OR means and the AND means when the line counter value is smaller than the (Y−C) signal but larger than the reference value and when the line counter value is smaller than the reference value but larger than the (Y+C) signal.

3. The signal waveform display device of claim 1 further comprising means for demodulating a color signal, means for storing color hue information of the input video signal into a memory, and means for indicating the chroma part of the waveform display output signal as a component of a predetermined color on the basis of at least one of a color hue and a color density demodulated and read out from the memory.

4. The signal waveform display device of claim 3 wherein the comparing means comprises a first digital comparator receiving the (Y+C) signal and the line counter value, a second digital counter receiving the (Y−C) signal and the line counter value, a third digital comparator comparing the line counter value and the reference value, means for executing an AND operation between output signals from the first and second digital comparators, means for executing an EXCLUSIVE-OR operation between output signals from the second and third digital comparators, means for outputting an active chroma signal on the basis of an output signal from the AND means when the line counter value is smaller than the (Y+C) signal but larger than the (Y−C) signal, and means for outputting an active non-chroma signal on the basis of outputs signals from the EXCLUSIVE-OR means and the AND means when the line counter value is smaller than the (Y−C) signal but larger than the reference value and when the line counter value is smaller than the reference value but larger than the (Y+C) signal.

* * * * *